(12) United States Patent
Zhu et al.

(10) Patent No.: US 12,556,651 B2
(45) Date of Patent: Feb. 17, 2026

(54) SYSTEMS AND METHODS FOR REAL-TIME MEETING SUMMARIZATION

(71) Applicant: MICROSOFT TECHNOLOGY LICENSING, LLC, Redmond, WA (US)

(72) Inventors: Chenguang Zhu, Issaquah, WA (US); Xuedong Huang, Yarrow Point, WA (US); Zong Zong Yuan, Bellevue, WA (US); Wei Xiong, Bellevue, WA (US); Nanshan Zeng, Bellevue, WA (US); Yuantao Wang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 18/132,709

(22) Filed: Apr. 10, 2023

(65) Prior Publication Data

US 2024/0340193 A1    Oct. 10, 2024

(51) Int. Cl.
*H04N 7/14* (2006.01)
*G10L 15/26* (2006.01)
*H04L 12/18* (2006.01)
*H04N 7/15* (2006.01)

(52) U.S. Cl.
CPC ........... *H04N 7/147* (2013.01); *G10L 15/26* (2013.01); *H04L 12/1831* (2013.01); *H04N 7/15* (2013.01); *H04N 7/155* (2013.01)

(58) Field of Classification Search
None
See application file for complete search history.

(56) References Cited

U.S. PATENT DOCUMENTS

| | | | |
|---|---|---|---|
| 9,977,574 B2 | 5/2018 | Quinn et al. | |
| 10,679,005 B2* | 6/2020 | Shires | H04N 7/15 |
| 11,080,356 B1 | 8/2021 | Kumar et al. | |
| 2014/0350930 A1 | 11/2014 | Cox et al. | |
| 2017/0277784 A1* | 9/2017 | Hay | G06F 16/683 |
| 2017/0324572 A1* | 11/2017 | Biggs | H04L 12/18 |
| 2019/0327103 A1* | 10/2019 | Niekrasz | G10L 15/26 |
| 2019/0347328 A1 | 11/2019 | Rush et al. | |
| 2020/0175962 A1 | 6/2020 | Thomson et al. | |

(Continued)

FOREIGN PATENT DOCUMENTS

| | | |
|---|---|---|
| CN | 107451110 A | 12/2017 |
| CN | 108108349 A | 6/2018 |

(Continued)

OTHER PUBLICATIONS

"Live transcription for Zoom meetings and webinars", Retrieved From: https://otter.ai/zoom, Retrieved On: Jan. 23, 2023, 4 Pages.

(Continued)

*Primary Examiner* — Quoc D Tran
(74) *Attorney, Agent, or Firm* — Workman Nydegger

(57) ABSTRACT

Systems and methods are provided for processing electronic content and generating corresponding output. Electronic content is received from a meeting, including recognizable speech content. This content is then summarized into real-time summary output by processing and encoding the meeting content while selectively alternating between unidirectional attention and bidirectional attention that is applied to the meeting contents.

16 Claims, 11 Drawing Sheets

(56) References Cited

U.S. PATENT DOCUMENTS

| | | | |
|---|---|---|---|
| 2020/0228358 A1 | 7/2020 | Rampton | |
| 2021/0074264 A1 | 3/2021 | Liang | |
| 2021/0383799 A1 | 12/2021 | Hewitt | |
| 2022/0060575 A1 | 2/2022 | Sachdev | |
| 2022/0093083 A1 | 3/2022 | Kurata | |
| 2022/0215052 A1* | 7/2022 | Chalana | G06F 16/739 |
| 2022/0414319 A1 | 12/2022 | De Oliveira et al. | |
| 2023/0343331 A1* | 10/2023 | Manuvinakurike | G10L 15/063 |
| 2024/0005085 A1* | 1/2024 | Kukde | G10L 25/78 |

FOREIGN PATENT DOCUMENTS

| | | |
|---|---|---|
| CN | 110717031 B | 5/2021 |
| CN | 113760900 A | 12/2021 |
| CN | 114372140 A | 4/2022 |
| CN | 114881008 A | 8/2022 |
| KR | 102464674 B1 | 11/2022 |
| WO | 2022143105 A1 | 7/2022 |

OTHER PUBLICATIONS

"Summaries, Questions, & Action Items", Retrieved From: https://web.archive.org/web/20221127094940/https://symbl.ai/features/questions-actionitems-followups/, Nov. 27, 2022, 9 Pages.

Suzgun, et al., "Follow the Wisdom of the Crowd: Effective Text Generation via Minimum Bayes Risk Decoding", In Repository of arXiv:2211.07634v1, Nov. 14, 2022, 26 Pages.

Hori, et al., "Unidirectional Neural Network Architectures for End-to-End Automatic Speech Recognition", Mitsubishi Electric Research Laboratories, Sep. 18, 2019, 7 pages.

International Search Report and Written Opinion received for PCT Application No. PCT/US2024/022696, Jun. 26, 2024, 14 pages.

International Preliminary Report On Patentability received for PCT Application No. PCT/US2024/022696, Oct. 23, 2025, 08 pages.

\* cited by examiner

SYSTEMS AND METHODS FOR REAL-TIME MEETING SUMMARIZATION

BACKGROUND

Meetings are a very common forum where people exchange ideas, make plans, and share information. With the ubiquity of automatic speech recognition systems comes vast amounts of meeting transcripts. These automatically generated meeting transcriptions, meeting summaries, and other downstream operations are of great importance to both the participants of the meetings and other parties interested in the meeting content. Because of the large volume of text included in the meeting transcripts, it is often difficult to sift through the content to find relevant information or get a general idea of the content of the meeting.

Conventional meeting summarization systems are configured to provide a meeting summary after a meeting, after processing a recording of the entire meeting. One reason for delaying the processing of meeting data until the meeting is concluded is that the meeting summarization processes can be quite time-intensive and it can be difficult for conventional systems to provide any meaningful meeting summarization information while the meeting is still ongoing. Conventional meeting summarization systems are also not configured to update their summarizations based on new information received after the initial processing of a recorded meeting.

It will be appreciated that there is an ongoing need for improved systems and methods for providing meeting summaries, especially for systems and techniques that could be used to provide summarization information for meetings and other media content in real-time, such as for meetings while they are still ongoing, as well as for streaming media content scenarios.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and systems for automatically processing electronic content and for generating corresponding output.

Some methods are provided, for example, for generating a real-time summary of a meeting based on speech recognized by various participants during a meeting, and before the meeting concludes. During the meeting, speech is identified, processed, and summarized in real-time as the electronic meeting content is processed by the disclosed meeting summarization systems. The real-time summary is generated by selectively alternating between applying unidirectional attention and bidirectional attention to the received electronic content during an encoding process.

Some embodiments are also directed to systems and methods for displaying electronic content from a meeting, including displaying and updating a real-time summary of the meeting, at a user interface. For example, systems receiving electronic content from a meeting can generate a real-time summary of the electronic content using the methods described above. As the electronic content is received and processed, the audio-visual meeting content from the meeting is displayed in a first window of the user interface while simultaneously displaying the real-time summary of the electronic content in a second window of the user interface.

Related embodiments describe how the audio-visual content is updated continuously while the real-time summary is updated periodically throughout the duration of the meeting.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include systems and methods for automatically processing electronic content and for generating summarization output based on the electronic content.

In some instances, for example, systems and methods are provided for generating a real-time summary of meeting content during the duration of a meeting by alternating between applying unidirectional attention and bidirectional attention applied to the meeting content that is being summarized during encoding of the electronic content. The real-time summary is generated in real-time during the meeting, or near real-time (e.g., concurrently with the meeting, while the meeting is still ongoing, before the end of the meeting).

Technical benefits of the disclosed embodiments include the ability to generate a real-time summary of a meeting, while the meeting is still occurring, and while still maintaining high-quality summarization. By alternating between the application of unidirectional and bidirectional encoding, the disclosed systems are able to achieve (i) more efficient processing with reduced latency, thereby enabling real-time summarization, as compared to only using bidirectional encoding and (ii) higher quality summaries as compared to summaries generated by only using unidirectional encoding.

Additional technical benefits are achieved by improving the user experience at the user interface. For example, disclosed embodiments provide a user interface that displays the meeting content, the meeting transcription, and a real-time summary. Typically, users have to wait until the end of a meeting to receive a summary of the meeting. In disclosed embodiments, users have access to the real-time summary. Additionally, the user experience can be further improved with periodic updates that are distinguished from previously summarized portions of the meeting.

Figure 1:
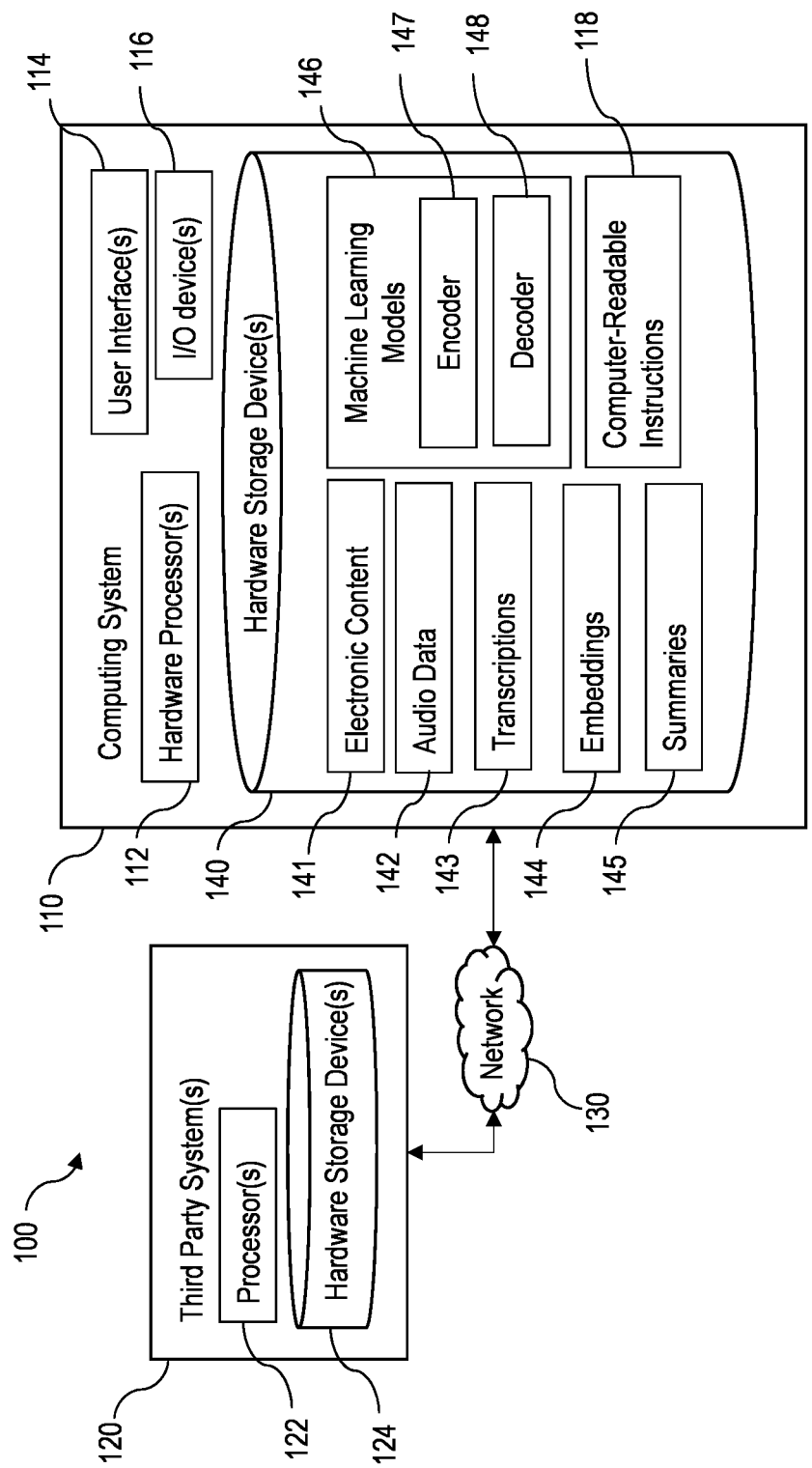
FIG. 1 illustrates a computing environment in which a computing system incorporates and/or is utilized to perform disclosed aspects of the disclosed embodiments.

Attention will be first directed to FIG. 1, which illustrates the computing system 110 as part of a computing environment 100 that also includes remote system(s) 120 in communication (via a network 130) with the computing system 110.

The computing system 110 includes one or more processor(s) (such as one or more hardware processor(s) 112) and storage (i.e., hardware storage device(s) 140) storing computer-readable instructions 118 wherein one or more of the hardware storage device(s) 140 can house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown, the computing system is in communication with remote system(s) 120 comprising one or more processor(s) 122, one or more of the computer-readable instructions 118, and one or more hardware storage device(s) 124. It is anticipated that, in some instances, the remote system(s) 120 further comprise databases housing data that could be used as training data, for example, text data not included in local storage. Additionally, or alternatively, the remote system(s) 120 include machine learning systems external to the computing system 110 and/or software programs or applications.

The illustrated storage (e.g., hardware storage device(s) 140) is shown as a single discrete storage unit. However, it will be appreciated that this storage can also be distributed among several separate and sometimes remote system(s) 120. The computing system 110 can also comprise a distributed system with one or more of the components of computing system 110 being maintained/run by different discrete systems that are remote from each other and each performing different tasks. In some instances, a plurality of distributed systems performs similar and/or shared tasks for implementing the disclosed functionality, such as in a distributed cloud environment.

The storage (e.g., hardware storage device(s) 140) includes computer-readable instructions 118 for instantiating or executing one or more of the models shown in the computing system 110.

The computing system 110 is configured to generate, train, and use various machine learning models, including a machine learning model 146 configured to generate real-time summaries of meeting content. The machine learning model 146 comprises an encoder 147 configured to encode input audio tokens and generate a set of embeddings, and a decoder 148 configured to decode the embeddings and generate a meeting summary.

The referenced models are configured as machine-learning models or machine-learned models, such as deep learning models and/or algorithms and/or neural networks. In some instances, the one or more models are configured as engines or processing systems (e.g., computing systems integrated within computing system 110), wherein each engine comprises one or more processors (e.g., hardware processor(s) 112) and computer-readable instructions 118 corresponding to the computing system 110.

The referenced storage (e.g., hardware storage device(s) 140) is also configured to store and/or cache in a memory store the different data types including the electronic content 141, audio data 142, transcriptions 143, embeddings 144, and summaries 145.

Electronic content 141 is obtained through an audio-visual service that records and/or streams audio-visual content. For example, electronic content 141 comprises video and audio that has been recorded or that is being streamed live.

Audio data 142 is included in the electronic content and comprises spoken language utterances by one or more speaker participants in the meeting. Transcriptions 143 are generated by applying automatic speech recognition to the audio data 142. Embeddings 144 comprise vector representations of the audio data 142.

The referenced summaries 145 comprise summarized output of the electronic content associated with meetings. Summaries 145 can be generated at various granularities of summarization, with coarse granularity referring to more sparse/more general summaries and fine granularity referring to more detailed/more specific summaries.

Summaries 145 can be configured or stored in a variety of different formats, including abstractive summaries, summaries organized into chronological paragraphs, summaries organized by speaker, automatically populated templates, bullet point or outline-based summaries, and/or other output that represents the main ideas and relevant details of the meeting. The summaries can also include links to external content related to the summarized data, such as links to related documents, calendar event links, and speaker contact information.

The type of summary output is determined by the format and characteristics of the training data used to train the summary machine learning model. In some instances, a user can select a particular summary output from a plurality of summary output types. Additionally, in such instances, a user can dynamically switch between summary output types during a meeting (e.g., by providing a request or input corresponding to the switch). The system is also able to automatically switch between summary output types based on identifying changes in the structure, context, or content of the meeting, even without detecting input from a user for switching summary types during the meeting.

Figure 2:
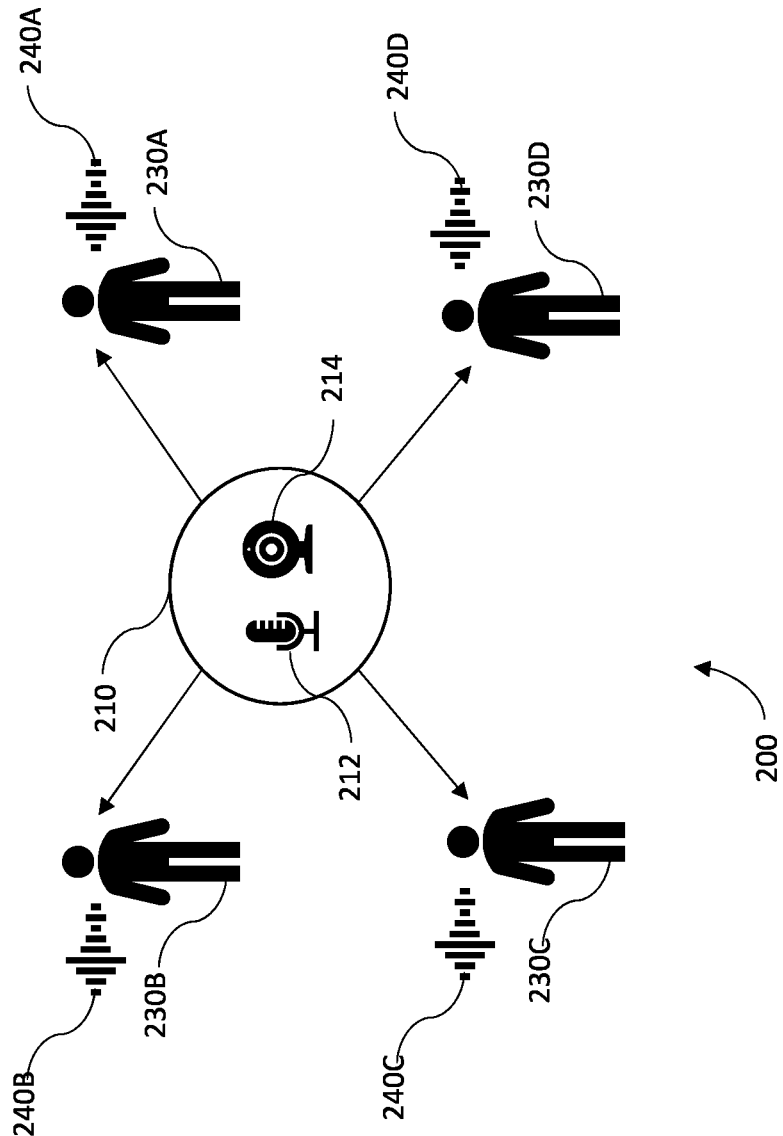
FIG. 2 illustrates an example configuration of a meeting being held by a plurality of participants.

Attention will now be directed to FIG. 2, which illustrates an environment in which a meeting assistant device is utilized to record electronic content associated with a meeting 200 having a plurality of meeting participants (i.e., speakers). For example, FIG. 2 shows a meeting assistant device 210 including at least a microphone 212 configured to record audio data and a camera 214 having image and/or video recording capabilities which are configured to record visual data.

A plurality of meeting participants (i.e., speakers and/or contributing entities) (e.g., participant 230A, participant 230B, participant 230C, participant 230D) are shown surrounding the meeting assistant device. In some instances, some or all speakers are joined in the meeting remotely through personal computing devices. In such embodiments, camera 214 and microphone 212 are representative of each participant's camera and microphone as part of a personal computing system.

It is anticipated that the audio speech produced by each of the meeting participants can be recorded simultaneously and/or in series. For example, in some meetings participant 230A speaks, then meeting participant 230B speaks. In such an embodiment, the recorded audio captured by the microphone includes audio speech 240A followed by audio speech 240B.

In some instances, participants 230C and 230D are speaking at the same time wherein audio speech 240C and audio speech 240D are overlapping in the recording captured by the microphone. Thus, in such instances, an ASR model is configured to identify each audio stream/audio recording and separate them into at least two recordings, one corresponding to audio speech 240C and one recording corresponding to audio speech 240D. The audio speech captured by microphone 212 is then able to be used in downstream data processing such as speech-to-text transcription, transcript post-processing, summarization, and/or template generation/population.

Figure 3:
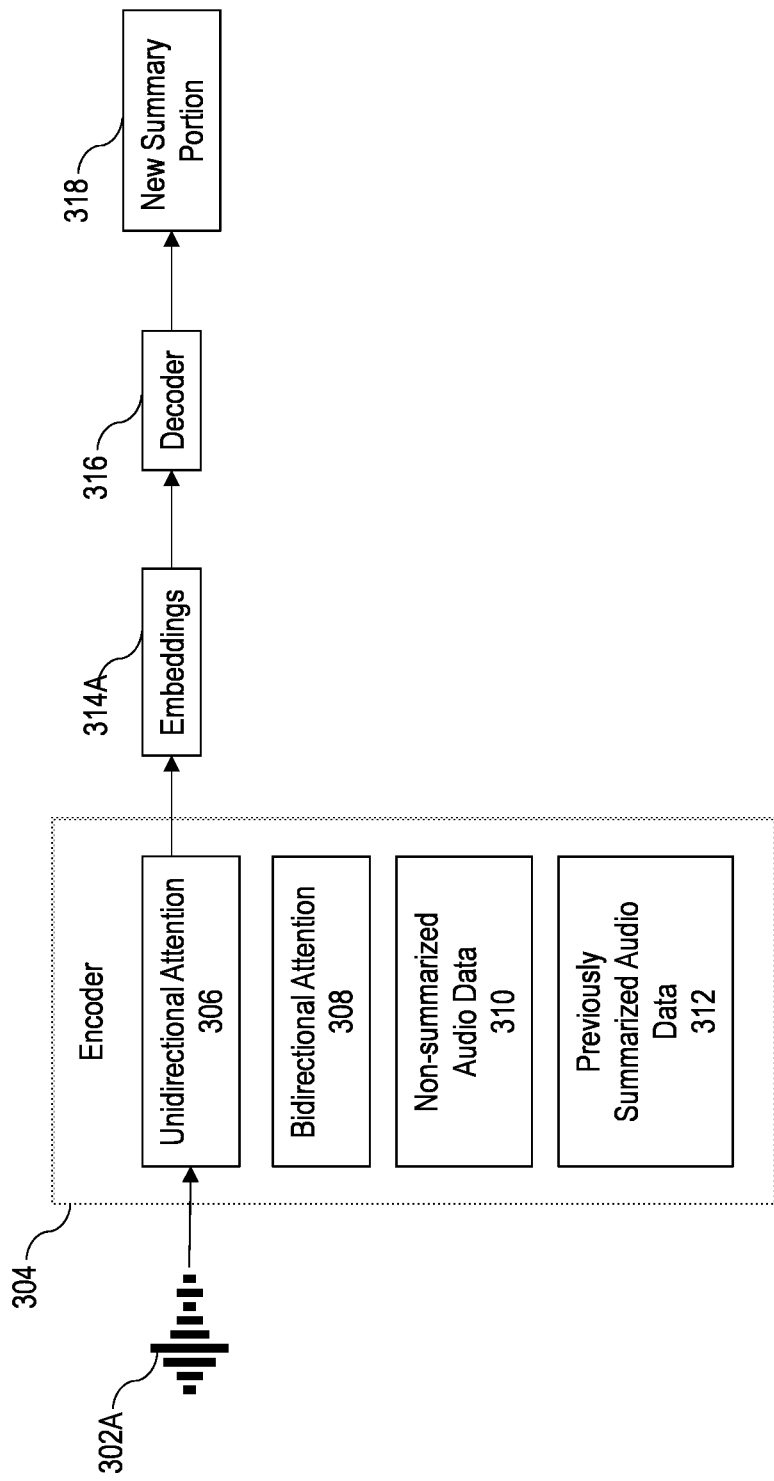
FIGS. 3-4 illustrate an example process of generating a real-time meeting summary.
Figure 4:
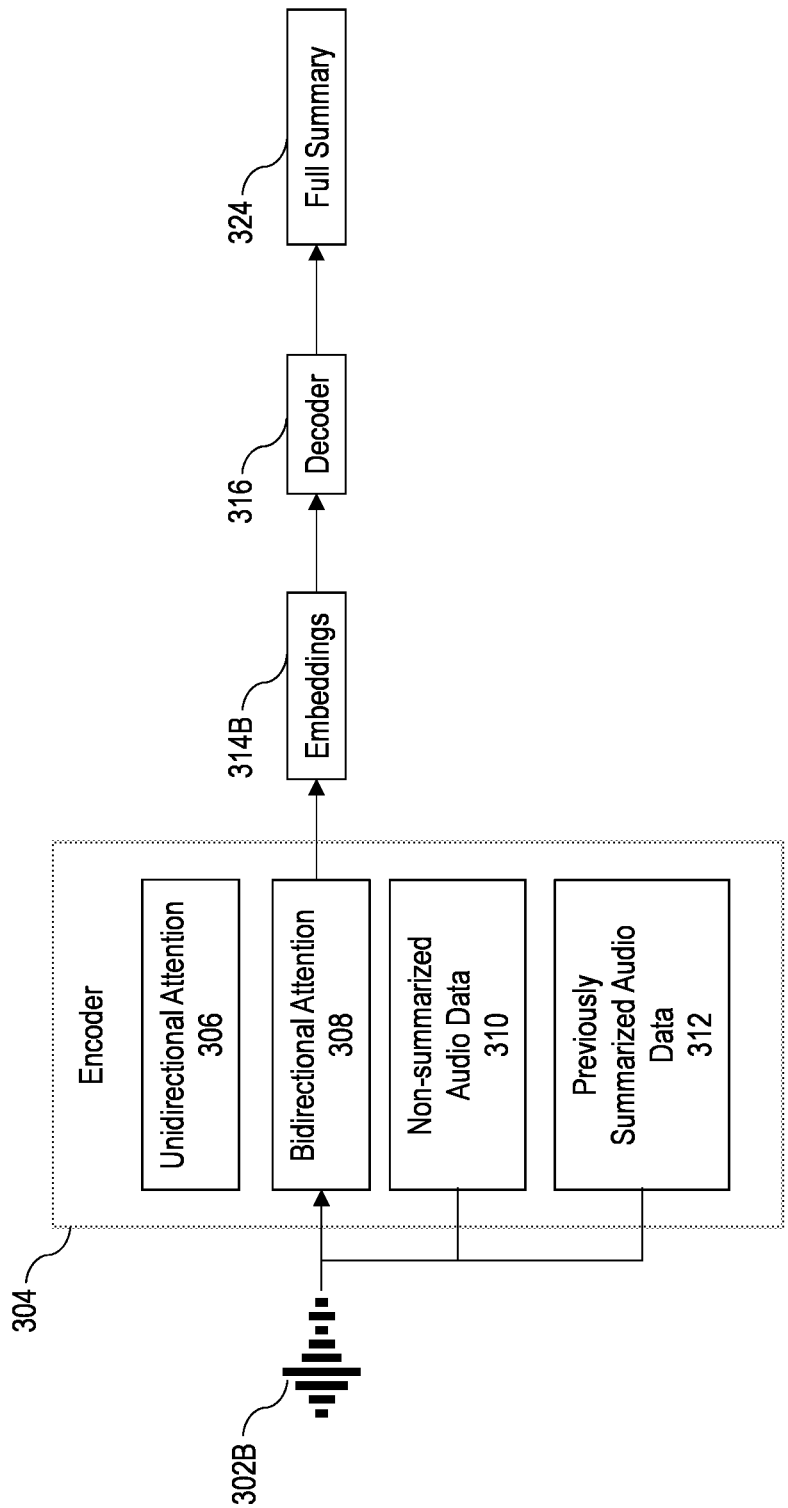
Figure 5:
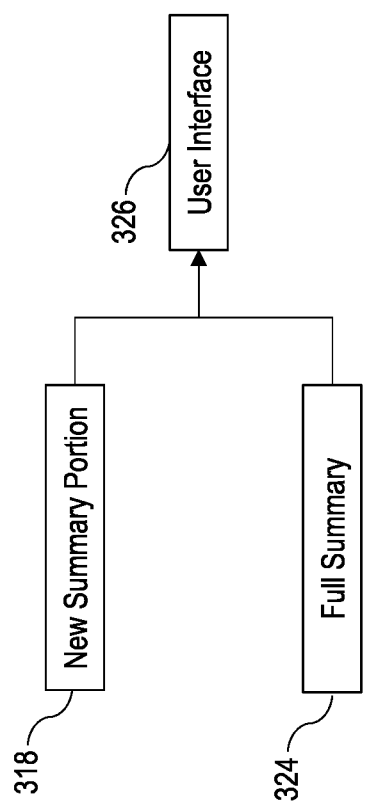
FIGS. 5-9 illustrate an example process of displaying and updating a real-time meeting summary at a user interface.
Figure 6:
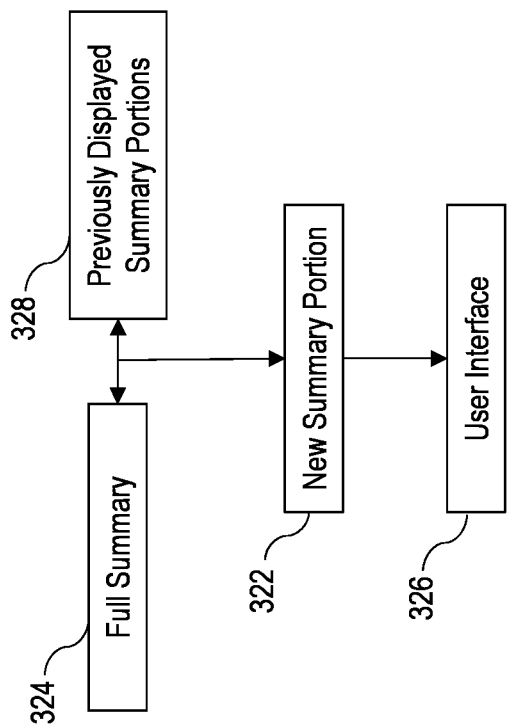

Attention will now be directed to FIGS. 3-4, which illustrate an example process of generating a real-time meeting summary of a meeting, for example, a meeting illustrated in FIG. 2. For example, the example process in FIG. 3 is shown having a first portion of input audio data 302A being applied as input to an encoder 304. The encoder 304 is configured to alternate between applying unidirectional attention and bidirectional attention to the audio data. When the system applies unidirectional attention, the encoder attends only to previous tokens in the input audio data. In contrast, when the system applies bidirectional attention, it attends in both forward and backward directions of the input audio data. Notably, because unidirectional encoding attends in only a single direction, it is computationally faster than bidirectional encoding. In particular, there is less data to compute for each encoder iteration when performing unidirectional encoding, as opposed to bidirectional encoding. That said, bidirectional encoding generates a more accurate, higher quality, and more information-rich set of embeddings than unidirectional encoding, even though unidirectional encoding is computationally more expensive and takes longer than bidirectional encoding.

Thus, disclosed embodiments are directed to systems and methods that capitalize on the speed of unidirectional encoding and the high quality of bidirectional encoding by selectively alternating between applying unidirectional attention and bidirectional attention to input audio data. Such embodiments provide an improved real-time meeting summarization and improved user interface experience when displaying and/or updating the real-time meeting summary for users.

The system determines the rate and pattern of alternation at which it performs unidirectional encoding vs. bidirectional encoding. In some instances, the system determines intervals between the different encoding attention techniques based on a predetermined quantity of content (e.g., audio data) received, a duration of time, or the length of the meeting transcript. In some instances, the default setting is to perform unidirectional encoding until a bidirectional triggering criterion is identified. Some examples of bidirectional triggering criteria include identifying a new speaker (such that all content associated with a previous speaker is summarized together using bidirectional encoding), identifying a new topic of conversation (such that all content associated with a previous topic is summarized together), or based on user input requesting a new full summary.

In some instances, where a user provides corrections to either the transcript or previously summarized portions, the system can determine to increase the rate at which it applies bidirectional encoding to the input audio data to correct past summary mistakes and prevent similar summary errors in the future.

As shown in FIG. 3, the system applies unidirectional attention 306 to the first portion of input audio and generates a first set of embeddings 314A. Decoder 316 then decodes the first set of embeddings 314A and generates a new summary portion 318 of the real-time summary.

For a certain interval or until a bidirectional triggering criterion is identified, the system continues to apply unidirectional attention to any new input audio (and any non-summarized audio data 310, if applicable). After a certain interval is completed or a bidirectional triggering criterion is identified, the system applies bidirectional attention 308 to audio data associated with the meeting.

As shown in FIG. 4, the system performs bidirectional encoding (i.e., applies bidirectional attention with the encoder 304) on the audio data included in all of the electronic content received up until the time the bidirectional encoding was triggered, which includes (i) a second portion of input audio data 302B, (ii) any non-summarized audio data 310 (i.e., audio data that was received but not yet summarized), and/or (iii) all previously summarized audio data 312. When the system performs bidirectional encoding, the encoder 304 generates a second set of embeddings 314B. The decoder 316 then decodes the second set of embeddings 314B and generates a full summary 324 of the meeting.

Attention will now be directed to FIGS. 5-9, which illustrate an example process of displaying and updating a real-time meeting summary at a user interface. For example, a user interface 326 (representative of user interface(s) 114) is updated, alternating between being updated with the new summary portion 318 and the full summary 324. In some instances, shown in FIG. 6, when the system generates a full summary 324, the full summary 324 is compared with the previously displayed summary portions 328. If no errors or differences are found between the portions of the full summary 324 and the previously displayed summary portions that correspond to the same set of audio data, the system is configured to only update the user interface 326 with the new summary portion 322.

However, if differences and/or errors are found when the full summary 324 is compared with the previously displayed summary portions 328, the user interface 326 is updated to display the full summary 324 (which replaces any previously displayed summary portions 328).

Figure 8:
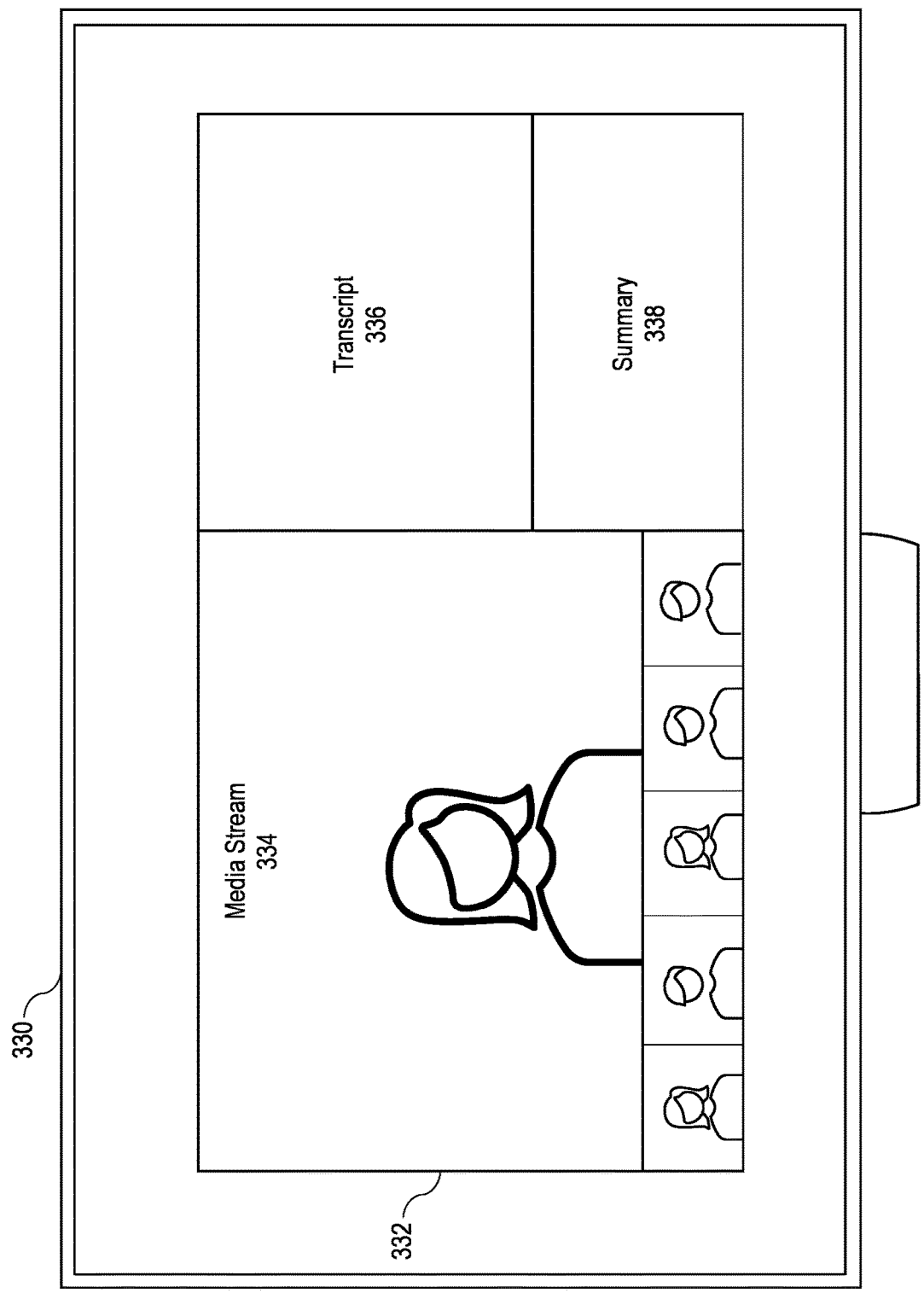

Attention will now be directed to FIG. 8, which illustrates an example user interface 332 (representative of user interface(s) 114) on an audio-visual display 330 of a computing system (e.g., computing system 110). The user interface 332 comprises a plurality of windows (e.g., media stream window 334, transcript window 336, and summary window 338). Alternatively, the user interface 332 comprises a single window that is subdivided into different dynamically updatable elements or sub-windows.

The media stream window 334 is configured to display to a user a previously recorded audio-visual recording that is now being streamed and/or a live streaming of a meeting. The media stream window 334 may include separate sections to display the current speaker/presentation and each of the other participants. The transcript window 336 is configured to display transcriptions of spoken language utterances that are recognized in the audio data of the electronic content of the meeting. In some instances, the transcript window 336 is updated continuously. The summary window 338 is configured to display a real-time summary of the electronic content associated with the meeting. As described further in the description of FIG. 9, the summary window 338 is updated periodically.

Figure 9:

Attention will now be directed to FIG. 9, which illustrates a meeting summarization encoding flow that includes alternating the application of unidirectional attention and bidirectional attention to electronic content being received and processed by a computing system (e.g., computing system 110) configured to generate summaries of meeting content. The flow also shows how the system provides controlled transcript updates on user interfaces generated by or utilized by the system (e.g., user interface 332) during the meeting summarization process.

For example, at various times (e.g., T1, T2, T4, T6, T8, T10, T11) the system receives audio data included in the electronic content and applies an automatic speech recognition (ASR) model that is configured to transcribe spoken language utterances recognized in the audio data. At these times when the system performs automatic speech recognition, the system is configured to update the transcript window 336 displayed on the user interface with transcriptions based on the most recently received electronic content. Additionally, at such times, the system refrains from updating the real-time summary.

After the system has received a certain amount of electronic content during a particular time interval, the system is configured to generate a partial real-time summary of the electronic content it has received during the particular time interval using unidirectional encoding at certain times (e.g., T3, T7, T9, and T12). For example, after the system has received electronic content at T1 and T2, the system applies unidirectional attention at T3 to the electronic content it has received up to T3. Using unidirectional attention, the system generates a new set of embeddings which are subsequently decoded to generate a real-time summary of the electronic content which has not been summarized yet.

In such instances, the system also updates the real-time summary with a new portion of the real-time summary (e.g., update partial summary). The new portion of the real-time summary is appended to any previously generated real-time summary. The real-time summary window is also updated to display the new portion of the real-time summary, in addition to any previously generated summary portions.

In some instances, the summary window 338 is updated continuously with partial summary updates, like the transcript window 336. Alternatively, the summary window 338 is updated periodically. In some instances, the system also updates the transcript (e.g., in the transcript window 336) with any new transcriptions simultaneously or concurrently with the updating of the summary window 338.

In addition to utilizing unidirectional attention, throughout the processing of the electronic content, the system is also configured to periodically apply bidirectional attention during the encoding of electronic content that has been transmitted to and received by the system. For example, as also shown in FIG. 9, the system performs bidirectional encoding at certain times (e.g., T5 and T13) to all of the electronic content received up until a certain time (e.g., electronic content received through T5; or through T13).

Using bidirectional attention, the system generates a set of embeddings which are subsequently decoded to generate a real-time summary of all of the received electronic content. In such instances, the system also updates the real-time summary in the summary window 338. In some instances, any new portions of the real-time summary are appended to the previously generated real-time summary. Additionally, or alternatively, the new real-time summary that is generated using the bidirectional encoding replaces the entirety of the previously generated real-time summary.

The flow illustrated in FIG. 9 clarifies how the disclosed systems are configured to selectively alternate between applying unidirectional encoding and bidirectional encoding during the processing of meeting content. This flow also illustrates how the disclosed systems are further configured to update the transcript window 336 with new transcriptions corresponding to the ongoing meeting content that is being summarized.

In some embodiments, the disclosed systems are configured to update the summary window 338 with new portions of the real-time summary when unidirectional encoding has been applied to or with on the electronic content which has been received but not yet summarized.

Additionally, the system updates the summary window 338 with (i) new portions of the real-time summary corresponding to the most recent electronic content which has not been previously summarized, or (ii) the entire new real-time summary when it has applied or otherwise performed bidirectional encoding to all of the electronic content that has been received, including portions of electronic content which have already been summarized.

As shown in FIG. 9, the disclosed systems are further configured to update the transcript window 336 with new transcriptions more frequently than it updates the summary window 338.

The systems may alternate between updating the summary window 338 with a partial summary (e.g., when it has applied unidirectional attention to the electronic content) and with a full summary (e.g. when it has applied bidirectional attention to the electronic content). In some instances, as shown in FIG. 9, the summary window 338 is updated with partial summary updates more frequently than the summary window 338 is updated with full summary updates.

In some instances, the time intervals between performing ASR and performing unidirectional encoding are equal throughout the meeting duration. Additionally, or alternatively, the time intervals are different, for example, based on different triggering criteria (e.g., a new speaker is identified, or a predetermined length of transcript is generated).

In some instances, the time intervals between performing unidirectional encoding and bidirectional encoding are equal throughout a meeting. Additionally, or alternatively, such time intervals are different, based on the different triggering criteria (e.g., a new speaker being identified, an end of a meeting being identified, a change of topic, an amount of content received, or time elapsed) or a predetermined configuration of different intervals.

It will be appreciated that while FIG. 9 illustrates a process that performs automatic speech recognition to generate transcriptions in series (or in parallel) with generating real-time summaries, some alternative embodiments include systems that are configured to perform real-time summary generation without generating ASR transcriptions of the meeting content.

In other embodiments, the real-time summary window is also updated to display the new portion of the real-time summary and/or is updated to display the entire new real-time summary (i.e., replacing any previously displayed portions of the real-time summary). In some instances, the system also updates the transcript (e.g., in the transcript window 336) with any new transcriptions as they are generated or detected.

By updating the summary window 338 less frequently than the transcript window 336, the user experience is improved. For example, it is easier to view (i.e., it is less visually taxing) to pay attention to one window at a time that is being dynamically updated.

By way of example, a user can view the meeting content window (e.g., media stream window 334) and/or transcript window 336 (which is continuously being updated as closed captioning for the meeting content) as the meeting progresses and then review the summary window 338 only when periodic updates are made.

Additionally, because the system generates new portions of the real-time summary at certain intervals, the summary output is more meaningful by providing a robust summary of any new information when unidirectional encoding has been performed.

Furthermore, by alternating between applying unidirectional encoding and bidirectional encoding, the user experience related to the summary window 338 is also improved. For example, because unidirectional encoding is faster than bidirectional encoding, the summary window 338 can be updated more frequently than if only bidirectional encoding were used. This facilitates the real-time aspect of the summary generation. Then, to improve the accuracy and quality of the summary, the summary window 338 is updated with a new real-time summary of all electronic content that has been received.

It is beneficial that this full summary update is performed less frequently than the partial summary update, in some instances, because it could be distracting/difficult to follow what new portions of the summary are added if the entire summary is replaced with a newly generated real-time summary in the summary window 338 every time the system was configured to update the summary window 338.

Figure 10:
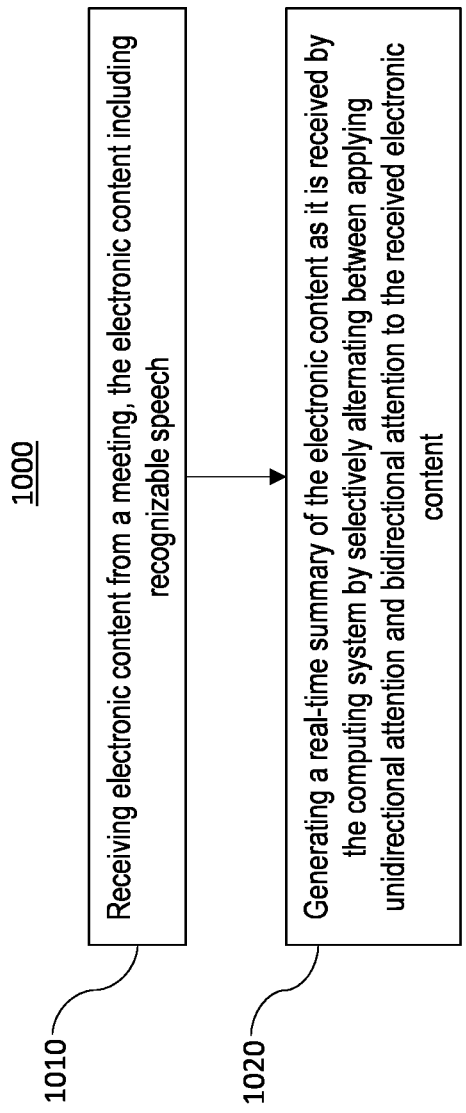
FIG. 10 illustrates an example embodiment of a flow diagram having a plurality of acts associated with methods for generating a real-time meeting summary.

Attention will now be directed to FIG. 10 which illustrates a flow diagram 1000 that includes a plurality of acts (act 1010 and act 1020) associated with exemplary methods for generating a real-time meeting summary that can be implemented by computing systems, such as computing system 110 described above in reference to the figures described above.

The first illustrated act includes an act for receiving electronic content (e.g., electronic content 141) from a meeting (e.g., meeting 200) (act 1010). The electronic content includes recognizable speech. After receiving the electronic content, the system generates a real-time summary (e.g., summaries 145) of the electronic content as the computing system receives it by selectively alternating between unidirectional attention (e.g., unidirectional attention 306) and bidirectional attention (e.g., bidirectional attention 308) to the received electronic content (act 1020).

By selectively alternating between unidirectional attention and bidirectional attention, the system is able to optimize a trade-off between faster summary generation using unidirectional attention and higher quality summarization using bidirectional attention.

In some instances, unidirectional attention is applied to a most recent subset of electronic content which has not been summarized (e.g., input audio data 302A). Additionally, or alternatively, when non-summarized audio data is waiting in a storage cache, the system is configured to apply bidirectional attention to a recent subset of electronic content which has not been summarized (e.g., non-summarized audio data 310). When the system is configured to generate a new full summary (i.e., the most up-to-date summary), bidirectional attention is applied to all of the electronic content that has been received (e.g., input audio data 302B, non-summarized audio data 310, and previously summarized audio data 312).

The system can determine when and how to update the real-time summary. For example, in some instances, a new portion (e.g., new summary portion 322) of the real-time summary is generated without updating a previously generated portion of the real-time summary (see FIG. 6). Alternatively, in some instances, the system is configured to update a previously generated portion of the real-time summary simultaneously with generating a new portion of the real-time summary for electronic content that has been received but not summarized (see FIG. 7).

As mentioned above, in some instances, the unidirectional attention is applied more frequently than bidirectional attention to the received electronic content (see FIG. 9). By applying unidirectional attention more frequently, the system can generate summary portions quickly, thus enabling real-time summary generation. The system is then able to periodically use bidirectional encoding to improve the quality of the summary portions generated using unidirectional encoding without significantly increasing the computational cost. For example, the system can determine a particular frequency at which bidirectional attention is applied to the electronic content.

The frequency for applying the different attentions and for switching which attention is applied can be based on different criteria. For example, in some instances, the particular frequency or duration of applying one or more of the attentions is based on a temporal threshold (e.g., a predetermined period or interval of time), an amount of electronic content that has been received, or based on identifying that a new speaker is speaking in the electronic content. The intervals are also determined, in some instances, based on the context, content, and/or structure of the meeting.

The summarization process can be further fine-tuned and customized by a user. For example, in some instances, the real-time summary is generated at a particular granularity based on a user selecting the particular granularity from a plurality of granularities. A coarser granularity means a more sparse or generalized summary, while a finer granularity means a more detailed summary. The particular granularity is also associated with a summary output type. A user can select a summary output type from a plurality of pre-trained summary output types from a user interface presented to the user along with summarization preference options that the user can select.

Figure 11:
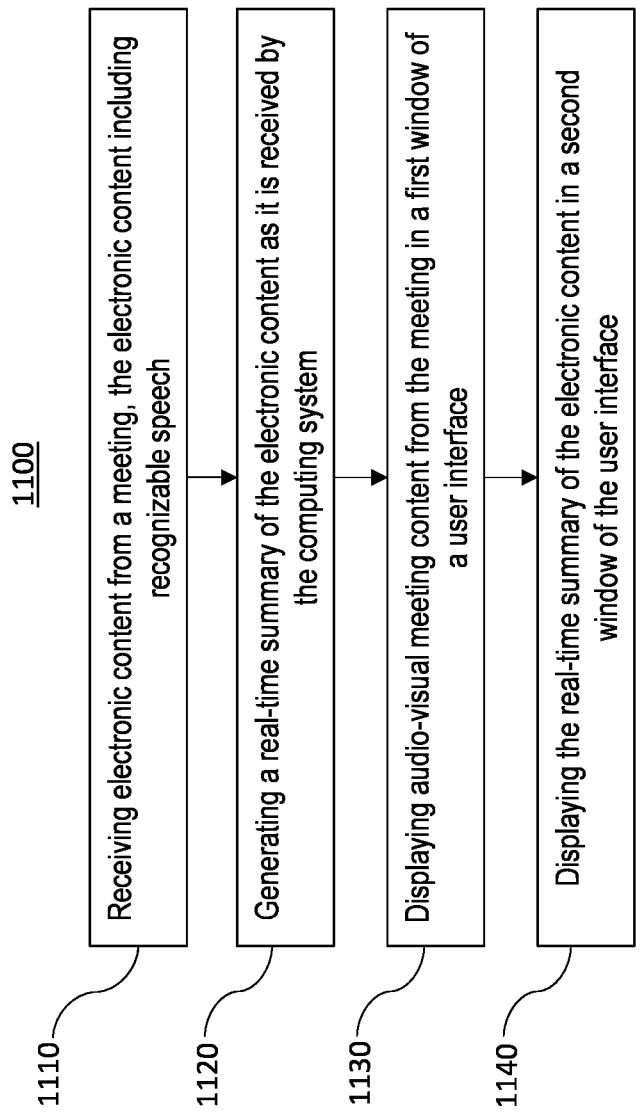
FIG. 11 illustrates an example embodiment of a flow diagram having a plurality of acts associated with methods for displaying and updating a real-time meeting summary at a user interface.

Attention will now be directed to FIG. 11 which illustrates a flow diagram 1100 that includes a plurality of acts (act 1110, act 1120, act 1130, and act 1140) associated with exemplary methods for displaying and updating a real-time meeting summary at a user interface that can be implemented by computing systems, such as computing system 110 described above in reference to the figures described above.

The first illustrated act includes an act for receiving electronic content (e.g., electronic content 141) from a meeting (e.g., meeting 200) (act 1110). The system then generates a real-time summary (e.g., summaries 145) of the electronic content as the computing system receives it. During the meeting, the system displays audio-visual meeting content from the meeting in a first window (e.g., media stream window 334) of a user interface (e.g., user interface 332).

The system also displays the real-time summary of the electronic content in a second window (e.g., summary window 338) of the user interface. This improves the user experience by simultaneously displaying the meeting and the summary of the meeting.

By implementing systems and methods in this manner, a user can access a real-time summary of the meeting. This is especially beneficial in several meeting scenarios. For example, if a user joins the meeting late and needs to catch up on the previous details of the meeting, the user can read through the summary of the meeting provided, instead of having to read the entire transcript of the meeting portion that was not attended. If a user has to leave the meeting temporarily and then returns to the meeting, the user can quickly review the meeting content that was missed by reviewing the real-time summary.

In some instances, the system is also configured to generate a transcription of the recognizable speech included in the electronic content and display the transcription of the recognizable speech in a third window (e.g., transcript window 336) of the user interface. In such instances, the system dynamically updates the transcription in the third window at a higher frequency than the real-time summary in the second window. For example, in some instances, the transcription is updated continuously while the real-time summary is updated periodically.

Figure 7:
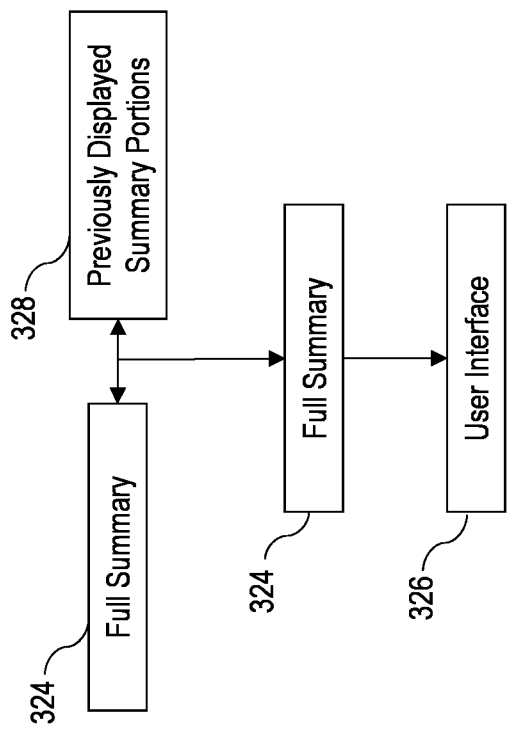

In some embodiments, a new portion of the real-time summary is generated without updating a previously generated portion of the real-time summary (see FIG. 6), while in other embodiments, the system updates a previously generated portion of the real-time summary simultaneously with generating a new portion of the real-time summary for electronic content that has been received but not summarized (see FIG. 7).

As described throughout, the real-time summary is generated by selectively alternating between applying unidirectional attention and bidirectional attention to the received electronic content (see FIG. 9). In particular, the unidirectional attention is applied at a higher frequency than the bidirectional attention (see FIG. 9).

Some disclosed methods further include acts for receiving user input comprising a correction to a previously generated portion of the real-time summary and updating a training feedback loop of the computing system based on the received user input. By implementing methods in this manner, the system can improve the accuracy and quality of the real-time summary. In some instances, the receipt of user corrections triggers an increase in the frequency at which bidirectional encoding is performed on the meeting content.

In view of the foregoing, it will be appreciated that the technical benefits of the disclosed embodiments include the ability to generate a real-time summary of a meeting, while still maintaining high-quality summarization. By alternating between applying unidirectional and bidirectional encoding, systems are able to achieve (i) faster summary generation times (thereby enabling real-time summarization) as compared to only using bidirectional encoding and (ii) higher quality summaries as compared to only using unidirectional encoding.

Additional technical benefits are achieved by improving the user experience at the user interface. For example, disclosed embodiments provide a user interface that displays the meeting content, the meeting transcription, and a real-time summary. Typically, users have to wait until the end of a meeting to receive a summary of the meeting. In disclosed embodiments, users have access to the real-time summary. Additionally, the user experience is improved because the entire summary updates only periodically, thereby helping to reduce the confusion about which updates are previously summarized portions of the meeting and which updates are new portions of the meeting summary.

Example Computing Systems

Embodiments of the present disclosure may comprise or utilize a special-purpose or general-purpose computer, such as the computing systems disclosed herein, including computer hardware and software. Embodiments within the scope of the present disclosure include, for example, physical storage media and other computer-readable media for carrying or storing computer-executable instructions and/or data structures. Such computer-readable media can be any available media that can be accessed by a general-purpose or special-purpose computer system.

Computer-readable media that store computer-executable instructions are physical hardware storage media or devices that exclude transmission media. Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

Computer-readable media that carry computer-executable instructions or computer-readable instructions in one or more carrier waves or signals are transmission media. Transmission media can include a network and/or data links that can be used to carry, or desired program code means in the form of computer-executable instructions or data structures, and which can be accessed by a general purpose or special purpose computer.

Thus, by way of example, and not limitation, embodiments of the disclosure can comprise at least two distinctly different kinds of computer-readable media: physical computer-readable storage media/devices and transmission computer-readable media.

Combinations of the above are also included within the scope of computer-readable media, particularly when considering that computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions referenced herein are instructions and data which cause a general-purpose computer, special-purpose computer, or special-purpose processing device to perform a certain function or group of functions, such as the foregoing disclosed functionality. The computer-executable instructions may be structured as binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method implemented by a computing system for processing electronic content and generating corresponding output, the method comprising:
    receiving electronic content from a meeting, the electronic content including recognizable speech; and
    generating a real-time summary of the electronic content as the electronic content is received by the computing system by selectively alternating between applying unidirectional attention and bidirectional attention to the received electronic content, wherein the unidirectional attention is applicable at a first frequency to the electronic content, the bidirectional attention is applicable at a second frequency to the electronic content, and wherein the first frequency is higher than the second frequency.

2. The method of claim 1, wherein the unidirectional attention is applied to a most recent subset of electronic content which has not been summarized.

3. The method of claim 1, wherein the bidirectional attention is applied to a most recent subset of electronic content which has not been summarized.

4. The method of claim 1, wherein the bidirectional attention is applied to all of the electronic content that has been received.

5. The method of claim 4, wherein a new portion of the real-time summary is generated without updating a previously generated portion of the real-time summary.

6. The method of claim 4, further comprising:
    updating a previously generated portion of the real-time summary simultaneously with generating a new portion of the real-time summary for electronic content that has been received but not summarized.

7. The method of claim 1, wherein the second frequency is based on a time duration.

8. The method of claim 1, wherein the second frequency is based on an amount of electronic content that has been received.

9. The method of claim 1, wherein the second frequency is based on identifying that a new speaker is speaking in the electronic content.

10. The method of claim 1, wherein the real-time summary is generated a particular granularity based on a user selecting the particular granularity from a plurality of granularities.

11. A method implemented by a computing system for dynamically displaying electronic content from a meeting at a user interface, the method comprising:
    receiving electronic content from a meeting, the electronic content including recognizable speech;
    generating a real-time summary of the electronic content as it is received by the computing system, wherein the real-time summary is generated by selectively alternating between applying unidirectional attention and bidirectional attention to the received electronic content, wherein the unidirectional attention is applied at a first frequency to the electronic content, the bidirectional attention is applied at a second frequency to the electronic content, and wherein the first frequency is higher than the second frequency;
    displaying audio-visual meeting content from the meeting in a first window of a user interface; and
    displaying the real-time summary of the electronic content in a second window of the user interface.

12. The method of claim 11, further comprising:
    generating a transcription of the recognizable speech included in the electronic content; and
    displaying the transcription of the recognizable speech in a third window of the user interface.

13. The method of claim 12, further comprising:
    dynamically updating the transcription in the third window at a higher frequency than the real-time summary in the second window.

14. The method of claim 13, wherein a new portion of the real-time summary is generated without updating a previously generated portion of the real-time summary.

15. The method of claim 13, further comprising:
    updating a previously generated portion of the real-time summary simultaneously with generating a new portion of the real-time summary for electronic content that has been received but not summarized.

16. The method of claim 11, further comprising:
    receiving user input comprising a correction to a previously generated portion of the real-time summary; and
    updating a training feedback loop of the computing system based on the received user input.

* * * * *